United States Patent Office

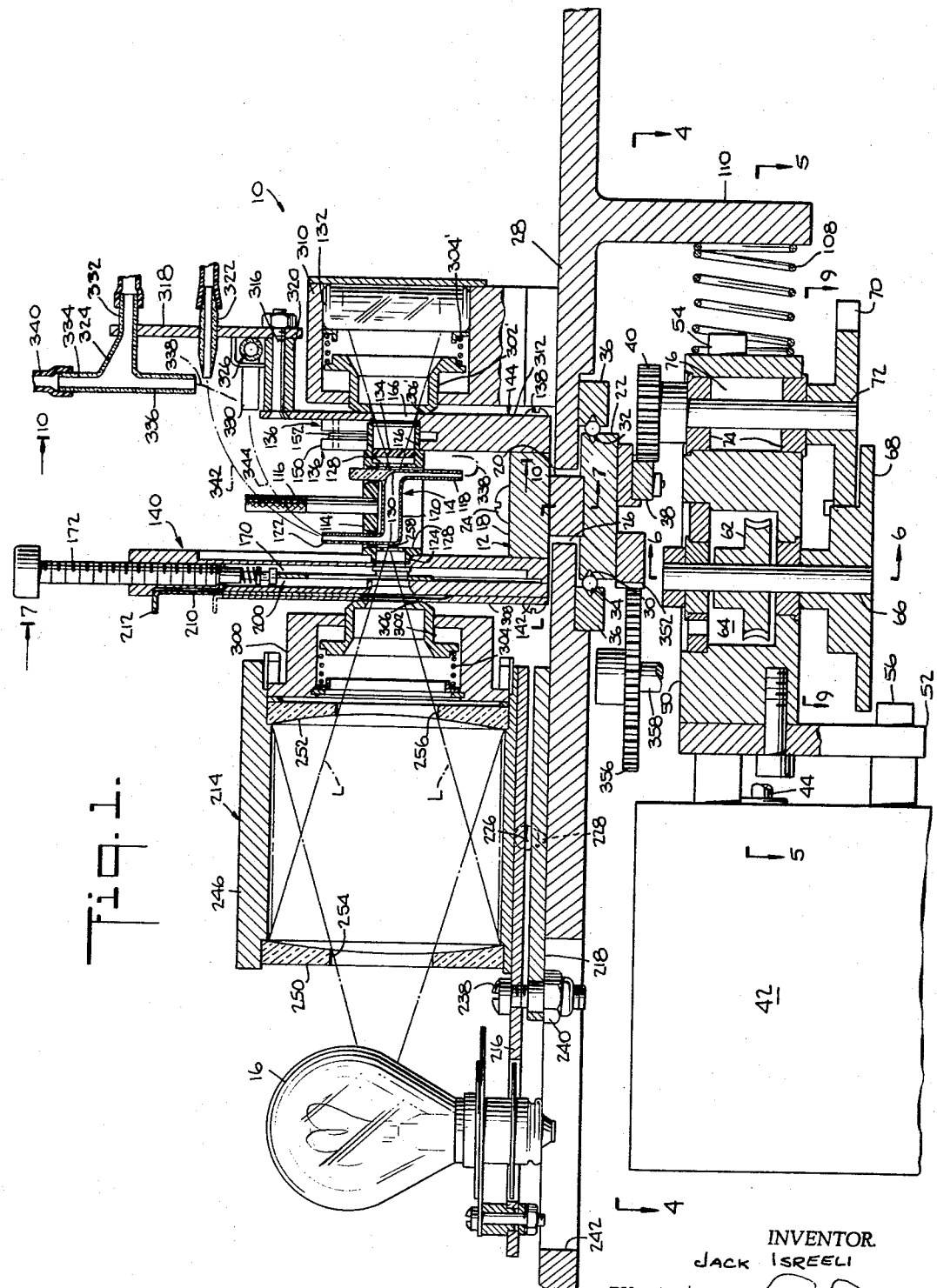

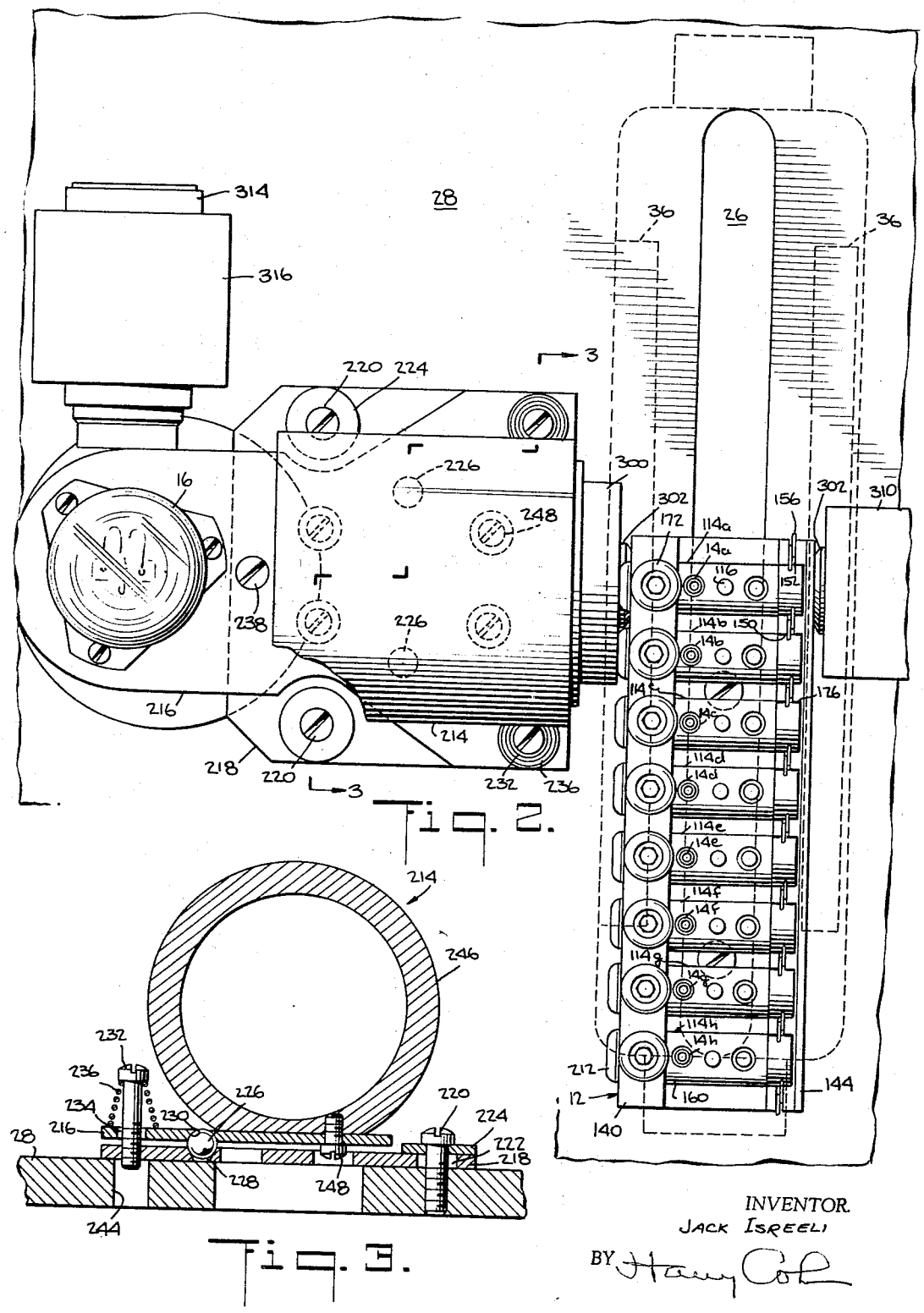

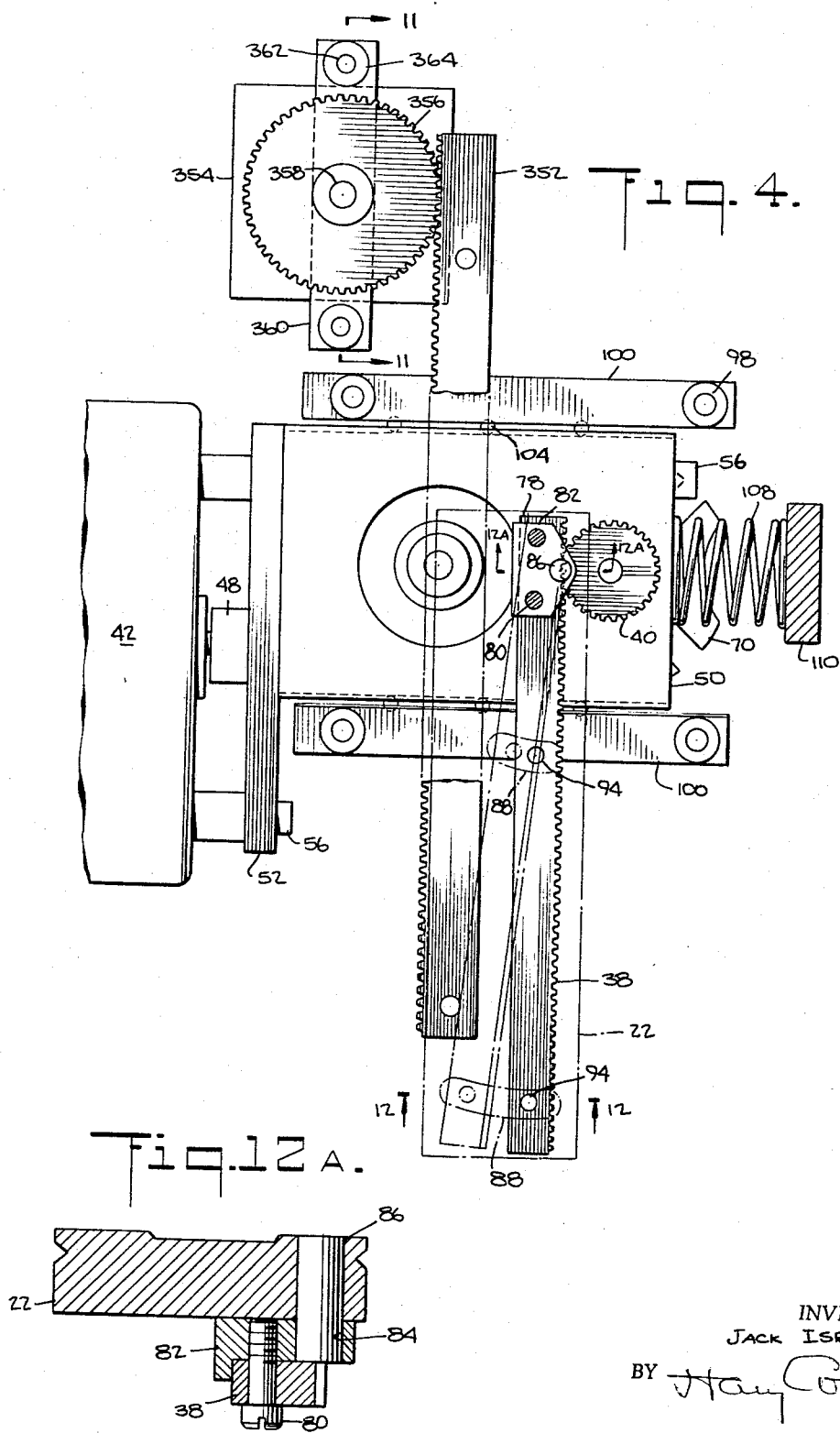

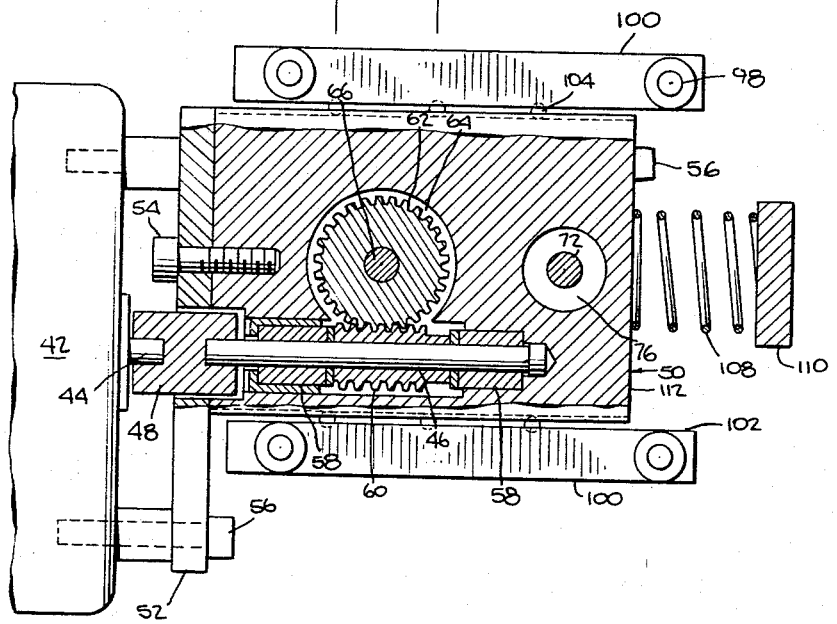
Fig. 5.
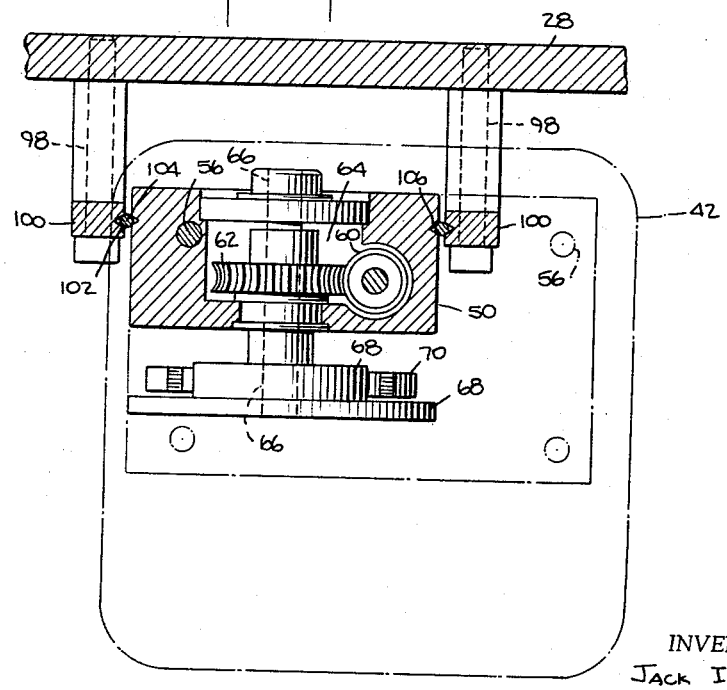
Fig. 6.
INVENTOR.
JACK ISREELI
BY 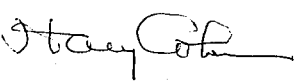
ATTORNEY

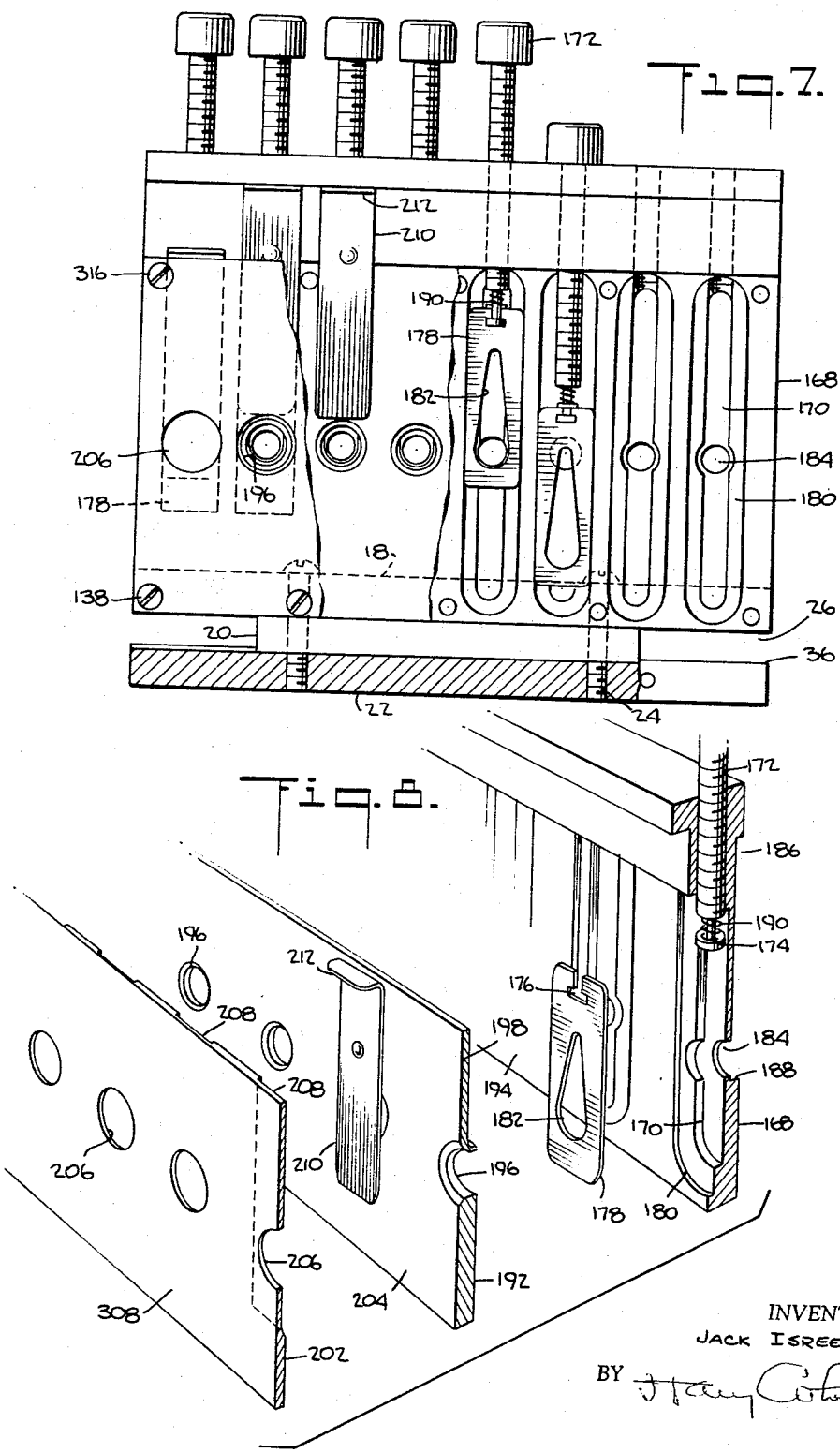

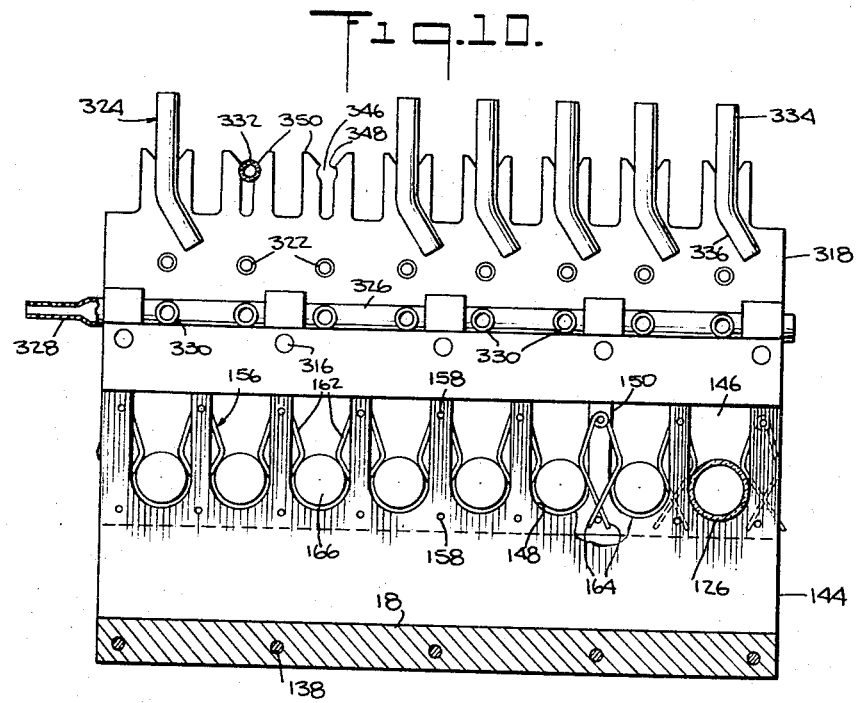
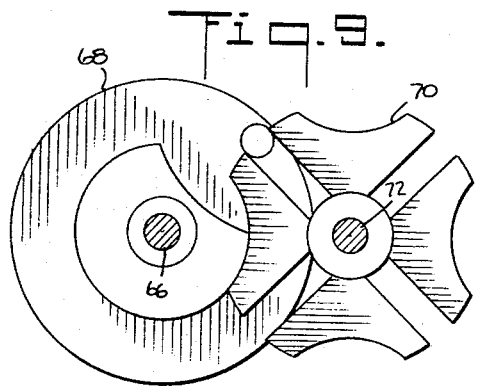
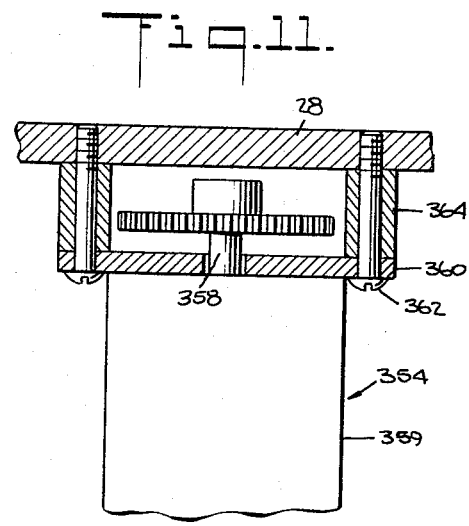
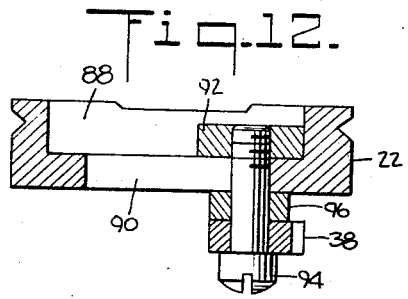

3,319,512
Patented May 16, 1967

3,319,512
COLORIMETER HAVING A PLURALITY OF FLOW CELLS THAT ARE SUCCESSIVELY MOVED TO A TEST STATION
Jack Isreeli, Tuckahoe, N.Y., assignor to Technicon Instruments Corporation, Chauncey, N.Y., a corporation of New York
Filed Oct. 31, 1962, Ser. No. 234,302
6 Claims. (Cl. 88—14)

This invention relates to colorimeters of the continuous flow cell type for the colorimetric examination of a liquid stream during its flow through the flow cell.

One object of the invention is to provide a colorimeter having a light source and sample and reference photoelectric detector cells with means for colorimetrically examining a series of separate streams, in succession, with respect to different substances present in the respective streams to determine the quantities of said different substances, respectively, in a liquid sample or a series of separate liquid samples.

Another object is generally to provide colorimeter apparatus of improved construction and which is especially useful in connection with apparatus for quantitative analysis of a liquid sample or a series of liquid samples with respect to at least two substances present in the sample or samples.

The above and other objects, features and advantages of the invention will be more fully understood from the following description of the invention considered in connection with the accompanying drawings which are to be considered illustrative of the invention and not in limitation thereof.

In the drawings:

FIG. 1 is a vertical sectional view of the colorimeter of the present invention;

FIG. 2 is a top plan view of the colorimeter;

FIG. 3 is a vertical sectional view taken on line 3—3 of FIG. 2;

FIG. 4 is a horizontal sectional view taken on line 4—4 of FIG. 1;

FIG. 5 is a horizontal sectional view taken on line 5—5 of FIG. 1;

FIG. 6 is a vertical sectional view taken on line 6—6 of FIG. 1;

FIG. 7 is a vertical sectional view taken on line 7—7 of FIG. 1 and with portions cut-away for purposes of illustration;

FIG. 8 is an exploded perspective view illustrating the relation of the parts of the shutter of the colorimeter;

FIG. 9 is a horizontal sectional view taken on line 9—9 of FIG. 1;

FIG. 10 is a vertical sectional view taken on line 10—10 of FIG. 1;

FIG. 11 is a vertical sectional view taken on line 11—11 of FIG. 4;

FIG. 12 is a vertical sectional view, on a larger scale, taken on line 12—12 of FIG. 4; and FIG. 12A is a vertical sectional view, on a larger scale, taken on line 12A—12A of FIG. 4.

According to the invention, the colorimeter includes provision for receiving a series of separate streams which have been separately treated for colorimetric analysis with respect to a substance present in the respective stream, as disclosed in the U.S. application of Edwin C. Whitehead, Leonard T. Skeggs, William J. Smythe, Milton H. Pelavin, and me, Ser. No. 234,308, filed Oct. 31, 1962, assigned to the assignee of the present application. As explained in said U.S. patent application, Ser. No. 234,308, a series of individual separate fluid samples are supplied, in succession, from a sample supply device and are formed into a sample stream which is divided into two or more sample streams depending upon the number of substances with respect to which the samples are being analyzed. Each of the sample streams is separately treated for quantitative analysis with respect to a substance present in that stream and the resulting treated streams are transmitted to analyzing means. The flow of the individually treated streams through the analyzing means is controlled so that corresponding portions of each of the treated streams arrive at the analyzing means, in succession, whereby each of the treated streams is analyzed in succession and the results of the analyses are recorded, in succession, on the chart of a recorder. The resulting record on the chart indicates the quantities of the different substances present in the sample.

The analyzing means includes the colorimeter of the present invention which, briefly described, comprises a series of individual flow cells, a pair of photoelectric detector cells, and a light source, which are mounted for relative movement with respect to each other to relative positions in which said flow cells are disposed, in succession, in the path of the light from the light source. Each of the treated streams is transmitted to a companion flow cell in a manner such that the color reacted portion of the stream flows through the flow cell during at least part of the period in which the flow cell is in position in the path of the light. The photoelectric cells operate a recorder and a record of the quantities of the different substances in the sample is provided on the chart of the recorder. The recorder has a movable stylus which is operated by a null-type current ratio balancing circuit which includes provision for varying the resistance of various components of the circuit, whereby the record of the analysis directly indicates the quantities of the different substances in the sample.

Referring now to the drawings in detail, the colorimeter 10 comprises a movable carriage 12 on which is mounted a series of flow cells 14, arranged in a straight row and laterally spaced from each other. The carriage is movable intermittently and transversely of the light beam L of light source 16 so that each flow cell is positioned in the path of the light beam, in succession, for a predetermined period of time for examining the stream flowing through the respective flow cell. The cell positioning movement of the carriage is accomplished automatically, under the control of a timer, as fully explained in the above mentioned U.S. application.

Carriage 12 comprises an upper bar 18, an intermediate bar 20 and a lower bar 22, all of which are secured to each other by longitudinally spaced screws 24. Intermediate bar 20 is positioned in an elongated slot 26 provided in the base support plate 28 of the colorimeter. Lower bar 22 is provided with longitudinally extending V-shaped grooves 30 provided along each of its sides and which are in sliding contact with a number of steel balls 32 which are retained in V-shaped recesses 34 provided in a pair of laterally spaced bars 36 which are secured to the bottom of support plate 28, so that carriage 12 is movable transversely of light source 16 which is an electric lamp.

The mechanism for moving the carriage intermittently and transversely of the light comprises a rack 38 which is mounted below bar 22 in engagement with a pinion 40. The drive for operating the pinion comprises a double shaded pole reversing motor 42 having an output shaft 44 which is connected to a rotary shaft 46 through a coupling 48. Shaft 46 extends into a block 50 which is secured to the housing of the motor by a support plate 52 and screws 54 and 56. The ends of shaft 46 are supported in bearings 58 which are mounted in block 50 and a worm 60 is secured to the shaft. The worm engages a worm wheel 62 which is positioned in a recess 64 provided in block 50 and is suitably secured to a rotary shaft 66 which is supported at the upper end of the block and extends through the recess of the block below the bottom thereof. A Geneva driver member 68 is mounted on the extending part of shaft 66 in operative relation with a Geneva driven member 70. The latter is mounted on a rotary shaft 72 which is supported in spaced bearings 74 that are mounted in an aperture 76 provided in block 50, and one end of shaft 72 extends upwardly from the block. The rack pinion 40 is mounted on said extending end of the shaft.

In order to permit variations in the length of movement of the carriage, without varying the speed of the motor or changing the mechanical connection between the motor and the carriage drive rack 38, the rack is mounted on the carriage so that it can be pivoted, as illustrated in FIG. 4. More particularly, one end 78 of the rack is secured, by screws 80, to a member 82 that is in sliding surface-to-surface contact with the undersurface of lower bar 22 of the carriage. Member 82 has a hole 84 into which a pivot pin 86 rotatably extends. The pivot pin is secured to bar 22 and extends downwardly therefrom into hole 84 and the rack is free to pivot about the pin 86 and is supported for said pivotal movement below bar 22 at positions intermediate its length and at its other end, as illustrated by FIGS. 4 and 12, it being understood that the means for supporting the rack at both these positions are identical. Bar 22 is provided with an upper arcuate slot 88 and a lower arcuate slot 90, which are in registry with each other, and each pair of slots is at the free end of the rack and at a position intermediate the length of the rack. The width of the lower slot is slightly less than the width of the upper slot so that a member 92 can move back and forth in the upper slot without falling through the lower slot. A screw 94 extends through the lower slot and is screwed into member 92 and carries rack 38 adjacent its head. A spacer 96 is provided between the bottom of bar 22 and the upper surface of the rack, and it will be understood that the construction illustrated by FIG. 12 is the same for both the intermediate and end positions of the rack. The foregoing construction permits pivotal movement of the rack and locking thereof in position at the correct angular position of the rack.

Pinion 40 is mounted for movement so that it is always in proper engagement with the teeth of the rack even though the latter is at an inclination. For this purpose, motor 42 and block 50 are suspended from colorimeter base support plate 28 for sliding adjustable movement to insure proper engagement of the gear and rack at all times. Four support posts 98 extend downwardly from base plate 28 and carry a pair of laterally spaced guides 100 which are provided with V-shaped recesses 102 along their respective confronting sides. Each recess retains a steel ball 104 and the sides of block 50 are provided with V-shaped longitudinally extending grooves 106 which engage balls 104, in sliding relation therewith, so that the block can slide along the rails. A compression spring 108 has one of its ends in abutment with a part 110 which extends downwardly from support plate 28, and the opposite end of the spring is in engagement with the confronting end 112 of the block, so that pinion 40 is biased into engagement with rack 38. It is to be observed, that due to the suspended and movable mounting of the motor and its connected parts, pinion 40 moves toward the rack, during the operation thereof, when the rack is in an inclined position as illustrated by FIG. 4.

A plurality of flow cells, namely cells 14a, 14b, 14c, 14d, 14e, 14f, 14g, and 14h are mounted on carriage 12 of the colorimeter in individual companion flow cell holders 114a, 114b, 114c, 114d, 114e, 114f, 114g and 114h, respectively. Each flow cell is mounted in its corresponding holder and the flow cell and holder assembly can be manually engaged by the handle 116 for easy mounting and removing of the flow cell and holder assembly from the colorimeter. The flow cell and holder, per se, are described and are claimed in my copending U.S. patent application, Ser. No. 231,408, filed Oct. 8, 1962, assigned to the assignee of the present application. Briefly described, the flow cell is a hollow transparent tubular member having a vertical inlet tube 118, a horizontal liquid passage 120 and a vertical outlet tube 122. The holder has opposite ends 124 and 126, respectively, which are hollow cylinders to permit the light to pass therethrough. The holder includes longitudinally spaced walls 128 having light apertures 130 in confronting relation with the opposite ends of passage 120 to permit the light to pass horizontally from light source 16 through the liquid in passage 120 and therefrom to a sample photoelectric detector cell 132. One or more filters 134 are suitably provided in hollow end 126 of the holder.

End 126 of the flow cell holder is resiliently and releasably held in position in a support mount 136 that is secured, by screws 138 to one side of upper bar 18 of carriage 12. End 124 of the holder is removably mounted in position in a support mount 140 that is secured to the other side of upper bar 18 by screws 142.

Mount 136 comprises a transversely extending plate 144 provided with a series of vertically extending, longitudinally spaced slots 146 which are provided with semicircular bottoms 148 against which the lower halves of cylindrical ends 126 of the holders rest in the mounted condition thereof, it being understood that the slots 146 correspond in number to the number of flow cell and holder assemblies. Adjacent slots are separated from each other by intervening partition walls 150 which are slotted as at 152, and a spring clip 156 is mounted in each slot. For this purpose, a pair of vertically spaced pins 158 is positioned in each of the slots, transversely thereof, and the opposite ends of the pins are mounted in the adjacent portions of walls 150. The opposite sides 160 of the holder (FIG. 2) are flat and slidably engage the adjacent sides of walls 150. The spring clips have V-shaped arms 162 and their ends 164 cross each other, as shown by FIG. 10, and engage the lower pins 158 while the upper ends of the spring clip are mounted on the upper pins. The arms are spring biased against the adjacent sides of ends 126 of the flow cell holder for releasably and resiliently retaining said ends in position in mount 136. To remove the holders from their mounted positions in the colorimeter, it is merely necessary to pull the holder by their handles 116, vertically upwardly, whereby ends 126 are readily removed from their spring engagements in the colorimeter. Plate 144 is provided with light apertures 166 in registry with ends 126 of the holders to permit passage of light to photoelectric cell 132.

Mount 140 for the opposite ends 124 of the flow cell holders includes provision for varying the size of the light apertures so that the amount of light which passes through the liquid undergoing colorimetric examination can be controlled readily. The mount comprises a transversely extending plate 168 which has a series of vertical grooves 170 that are longitudinally spaced from each other, in a direction transversely of the light. A series of adjusting screws 172 extend into grooves 170, respectively, and the lower end of each of the screws has a pin 174 which is rotatably mounted in a slot 176 provided at the upper end of a light aperture shutter 178 which is mounted for vertical sliding movement in a slot 180. The slot 180 is provided at every position of slots 170 as are the shutters, and each shutter is provided with a tear drop-shaped aperture 182 which is in registry with an aperture 184 provided in plate 168 at each position of a flow cell. The shutter is adapted to vary the size of said aperture by vertical movement of the shutter in relation to the companion aperture 184. The rear surface of plate 168 is provided with a vertical slot 186 at each position of screw 172 and the bottoms 188 of each of the slots 186 is semicircular and provides a support for the bottom half of circular end 124 of the flow cell holder 114. Slot 170 provides a vertical space (FIG. 1) in which part of pin 172 moves and springs 190 resiliently hold the pins in engagement with the companion shutters 178.

A transversely extending plate 192 is positioned against the forward surface 194 of plate 168, in surface-to-surface contact therewith, and the plate is provided with a series of longitudinally spaced light apertures 196 in registry with the corresponding apertures 184 of plate 168. The upper part 198 of plate 192 is thinner than its lower part to provide a longitudinally extending space 200 (FIG. 1) for the pin ends 174 of the adjusting screws 172.

Another longitudinally extending plate 202 is positioned against the front face 204 of plate 192, in surface-to-surface contact therewith, and is provided with a series of longitudinally spaced light apertures 206 which are in registry with the corresponding apertures 196 and 184 of plates 192 and 168, respectively. At each position of aperture 206, there is provided a relatively shallow vertical slot 208 in which a thin light-blocking shutter 210 is positioned and which is adapted to be moved vertically in its respective slot for closing adjacent aperture 196 so that no light can pass into the flow cell. The shutter is provided with an upper bent part 212 by which it can be moved up and down and it will be understood that it is frictionally held in position since all the plates are clamped together and held in position on bar 18 of carriage 12 by screws 142.

Lamp 16 and lens holder assembly 214 are mounted on a support plate 216 which can be tilted longitudinally, in the direction of the light path, and which can be moved both laterally, in a direction which is transversely of the light path, and longitudinally, in a direction which is parallel to the light path, for focusing the light at one end of liquid passage 126 of the flow cell, as shown in FIG. 1. More particularly, a support plate 218 is mounted for lateral adjusting movement on the upper surface of base plate 28. For this purpose, a pair of laterally spaced screws 220 extend through clearance holes 222 provided in the corners of one side of plate 218 and the screws are screwed into base plate 28. Each screw 220 extends through a clamping member 224 which overlies the corresponding hole 222 so that plate 218 can be adjustably clamped into position by tightening screws 220. It is to be observed that holes 222 are considerably larger than the outside diameter of screws 220 for permitting lateral and longitudinal adjusting movement of plate 218.

Plate 216, which carries light bulb 16 and focusing lens holder 214 is mounted on plate 218 so that it may be tilted relative thereto in a direction which is longitudinal of the light path. More particularly, a pair of laterally spaced ball supports 226 are rotatably mounted in corresponding conical holes 228 provided in plate 218 and plate 216 is provided with corresponding hemispherically shaped holes 230 for receiving the balls. A pair of laterally spaced screws 232 extend through clearance holes 234 provided in the corners of plate 216 which are adjacent the carriage 12, and the screws are screwed into plate 218. A conically shaped compression spring 236 is provided for each screw and one end of the spring engages the head of the screw while the opposite end of the spring engages the upper surface of plate 216. A tilt adjusting screw 238 is positioned centrally between spring biased screws 232, and is spaced laterally from spherical supports 226 so that said supports are between adjusting screw 238 and spring biased screws 232. Screw 238 extends through plates 216 and 218, respectively, and is provided with a nut 240 which may be tightened or loosened against the spring bias of springs 236 so that plate 216 can be tilted, either up or down as viewed in FIG. 1, about its spherical supports 226. The lower end of screw 238 extends into an opening 242 provided in base plate 28 and which also serves to provide cooling air for lamp 16. The base plate is also provided with laterally spaced clearance holes 244 to receive the extending ends of screws 232.

The lens holder 214 is a cylindrical sleeve 246 having a flat bottom which is secured to plate 216 by screws 248. Concave mirrors 250 and 252 are mounted in confronting relation at the opposite ends of the sleeve, thereby closing said opposite ends. The mirrors are of the type wherein the mirrored surface is constituted by the front surface thereof. Mirror 250 is provided with a central aperture 254 and mirror 252 is provided with a similar aperture 256. As best seen in FIG. 1, light from the source 16 enters through the aperture 254 of mirror 250 and strikes the concave reflecting surface of mirror 252 and is then reflected by the latter onto the concave mirrored surface of mirror 250. The latter focuses the light through aperture 256 of mirror 252 at the focal point 258 which is located at one end of the light passage 120 of the flow cell.

It is to be noted that the light passes through a cylindrical member 300 that is mounted on the end of sleeve 246. Member 300 is hollow and carries a hollow cylindrical open ended movable member 302 which is biased, by compression spring 304, so that its external end 306 is resiliently held against the front surface 308 of plate 202 in light-tight relation therewith. In this manner no external light is transmitted to the flow cell and only light from source 16 can enter the flow cell. The pressure of spring 304 is such as to permit surface 308 to slide with respect to end 306 of member 302 so as not to interfere with the transverse movement of the carriage.

The sample photoelectric cell 132 is mounted in position to receive light from the flow cell. For this purpose, the photoelectric cell is mounted in a stationary housing 310 that is suitably supported on base 28 and the housing carries an open ended hollow cylindrical member 302', which is spring biased, as by compression spring 304', so that its end 306', is in sliding light-tight engagement with the rear surface 312 of plate 144 to prevent any external light from reaching the photoelectric cell.

The reference photoelectric cell 314 is suitably mounted in a housing 316 containing suitable lenses and which has provision for holding necessary filters. The housing is suitably mounted on base plate 28 in position so that the reference photoelectric cell 314 receives light from light source 16 simultaneously with receipt of the light by sample photoelectric cell 132. The colorimeter is mounted in a housing (not shown) which shuts out any extraneous light.

The provision for transmitting liquid to and from the different flow cells will now be described in detail. Plate 144 has an upper part to which is secured, by screws 316, a longitudinally extending plate 318, spaced from plate 144 by spacers 320. Plate 318 carries a series of longitudinally spaced nipples 322, one for each flow cell, and a similar number of companion debubblers 324 which remove any gas or segmentizing fluid which is present in the incoming liquid, as described in U.S. Patent No. 3,047,367, issued July 31, 1962. A tubular passage 326 is secured to plate 318 and extends longitudinally thereof and has an outlet opening 328 (FIG. 10). A series of longitudinally spaced inlet tubes 330 are in fluid flow communication with passage 326 and it will be understood that an inlet tube is provided for each flow cell. Nipples 322 provide individual drains from each flow cell and are used where it is desired to separately collect the examined liquid. When it is not desired or necessary to collect the examined liquid, it can be discharged from the colorimeter through passage 326 which provides a common drain.

The treated segmented stream enters the colorimeter and passes into the horizontal arm 332 of the debubbler which removes segmentizing fluid of the treated stream through upper vertical arm 334, and the consolidated liquid of the stream flows down the lower vertical arm 336 and through a tube 338 (shown in dotted lines) to the inlet tube 118 of the flow cell. It will be understood, as described in the above mentioned U.S. Patent No. 3,047,367, that an aspirating tube 340 is connected to arm 334 for removing the segmentizing fluid and the tube may be operated by a suction pump tube as provided by a proportioning pump, as described in the above mentioned U.S. patent application. The examined liquid leaves the flow cell through outlet tube 122 and flows to either nipple 322, via tube 342 (shown in dotted lines) when it is desired to collect the examined liquid, or to the inlet tube 330 of the common drain passage 326, via tube 344 (shown in dotted lines) when it is not desired to collect the treated liquid.

The upper part of plate 318 is provided with a series of longitudinally spaced slots 346 (FIG. 10) corresponding in number to the number of debubblers provided. Each slot is provided with a circular tube holding part 348 for resiliently and releasably holding the debubbler by its horizontal tubular arm 332, and the side arms 350 which form slots 346 can flex slightly to resiliently engage the debubblers.

The movable carriage is provided with a rack 352 for operating a selector switch 354 that operates a recorder in accordance with the flow cell positioning movement of the carriage, as explained in the above mentioned U.S. application. The rack is secured to the undersurface of lower bar 22 of carriage 12 and is in mesh with a pinion 356. The gear is mounted on rotary shaft 358 of the selector switch which extends from housing 359 (FIG. 11) of the switch. The switch housing is secured to a plate 360 which is suspended from base plate 28 by screws 362 and spacers 364, adjacent the path of movement of the carriage.

It is to be understood that while the colorimeter has been described having a movable carriage carrying flow cells past a stationary light source and a stationary sample photoelectric cell, it is within the scope of the invention to provide a movable carriage carrying a light source and sample and reference photoelectric cells past stationary flow cells.

The present invention is also fully illustrated and described, but not claimed, in the above mentioned U.S. patent application Ser. No. 234,308, filed Oct. 31, 1962, and in which I am one of the joint inventors of the invention claimed therein.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for the colorimetric analysis of fluids comprising: a plurality of flow cells, each for receiving a stream of fluid therethrough; holding means for holding each of said plurality of flow cells; a source of light and a light detector having a common light path therebetween; moving means intercoupling said holding means, said source of light and said light detector to intermittently relatively traverse said holding means and said common light path to serially insert each flow cell into said light path, and hold each such flow cell stationary within said common light path for a predetermined interval of time during which the colorimetric analysis of the fluid may be performed; light control means coupled to said moving means for limiting the amount of light passing along said light path into each flow cell, said control means being variably adjustable with respect to each flow cell.

2. Apparatus for the colorimetric analysis of fluids comprising: a plurality of flow cells each for receiving a stream of fluid therethrough; holding means for holding each of said plurality of flow cells; a source of light and a light detector having a common light path therebetween; moving means intercoupling said holding means, said source of light and said light detector to intermittently relatively traverse said holding means and said common light path, to serially insert each flow cell into said light path, and hold each such flow cell stationary within said light path for a predetermined interval of time during which the colorimetric analysis of the fluid therein may be performed; said moving means normally traversing said holding means a predetermined distance, and including adjustable drive coupling means for reducing the distance traversed by said holding means.

3. Apparatus for the colorimetric analysis of fluids comprising: a base; a plurality of flow cells, each for receiving a stream of liquid therethrough; a source of light and a light detector having a common light path therebetween both fixed to said base; holding means for holding each of said plurality of flow cells in a uniformly spaced apart relationship, mounted for movement with respect to said base along a rectilinear path whereby each flow cell is serially inserted into said light path; a rack connected by a pivot to said holding means and having a rectilinear row of teeth normally disposed parallel to said rectilinear path, said rack being angularly adjustable about said pivot to dispose said rectilinear row of teeth at an angle to said rectilinear path; an intermittently rotated pinion resiliently biased into engagement with said rectilinear row of teeth for intermittently driving said rack.

4. Apparatus for the colorimetric analysis of fluids comprising: a base; a plurality of flow cells, each for receiving a stream of liquid therethrough; a source of light and a light detector having a common light path therebetween both fixed to said base; holding means for holding each of said plurality of flow cells in a uniformly spaced apart relationship, mounted for movement with respect to said base along a rectilinear path whereby each flow cell is serially inserted into said light path; a rack connected by a pivot to said holding means and having a rectilinear row of teeth normally disposed parallel to said rectilinear path, said rack being angularly adjustable about said pivot to dispose said rectilinear row of teeth at an angle to said rectilinear path; a drive assembly including a member mounted for movement with respect to said base at an angle to said rectilinear path, a motor fixed to said member and coupled to and driving a Geneva drive assembly which is mounted on said member and coupled to and driving a pinion which is mounted on said member; spring means connected between said base and said member for biasing said pinion into engagement with said rack.

5. Apparatus for the colorimetric analysis of fluids, comprising: a plurality of flow cells, each for receiving a stream of fluid therethrough; holding means for holding each of said plurality of flow cells; source and focusing means of light and a light detector having a common light path therebetween; moving means intercoupling said holding means, said source and focusing means and said light detector to intermittently relatively traverse said holding means and said common light path, to serially insert each flow cell into said light path, and hold each such flow cell stationary within said light path for a predetermined interval of time during which the colorimetric analysis of the fluid therein may be performed; said source and focusing means of light being adjustable with respect to said holding means by means of an intermediate member, said intermediate member being adjustably slidable laterally in a direction transverse to said light path and also slidable longitudinally in a direction parallel to said light path, said source and focusing means of light being carried by said intermediate member and adjustably tiltable about a pivot having an axis perpendicular to said path of light; whereby said source and focusing means of light may be adjusted to focus the light at a predetermined point on each of said flow cells as such flow cell is serially inserted into said path of light.

6. Apparatus for the colorimetric analysis of fluids, comprising: a plurality of flow cells, each for receiving a stream of fluid therethrough, and a holding means for holding said plurality of flow cells; each of said flow cells including a tubular portion having two, spaced apart, light permeable ends, an inlet adjacent one of said ends and an outlet adjacent the other of said ends; said holding means including two spaced apart parallel plate members for receiving therebetween said plurality of flow cells, means for individually, releasably mounting and retaining each said flow cell between said plate members, an aperture in each said plate member aligned with a respective light permeable end of a respective flow cell for the transmission of light with respect thereto, and adjustable aperture means coupled to one of said apertures for each respective flow cell for controlling the effective size of said coupled to aperture.

References Cited by the Examiner

UNITED STATES PATENTS

| | | | |
|---|---|---|---|
| 2,672,581 | 3/1954 | Gorham | 74—436 |
| 2,768,370 | 10/1956 | Maninger | 88—14 |
| 2,797,149 | 6/1957 | Skeggs | 88—14 |
| 3,026,764 | 3/1962 | Allen et al. | 88—14 |
| 3,046,831 | 7/1962 | Isreeli | 88—14 |
| 3,058,226 | 10/1962 | Michael | 88—39 |
| 3,090,863 | 5/1963 | McPherson | 88—14 |

JEWELL H. PEDERSEN, *Primary Examiner.*

FREDERICK M. STRADER, DAVID H. RUBIN, *Examiners.*

O. B. CHEW, *Assistant Examiner.*